US012118814B2

(12) United States Patent
Neal

(10) Patent No.: US 12,118,814 B2
(45) Date of Patent: Oct. 15, 2024

(54) SYSTEM AND METHOD FOR FACILITATING THE SYNCHRONIZATION OF WRITTEN WORKS WITH ACCOMPANYING AUDIO

(71) Applicant: MEDIAMACROS, INC., Johns Creek, GA (US)

(72) Inventor: Charles Neal, Alpharetta, GA (US)

( * ) Notice: Subject to any disclaimer, the term of this patent is extended or adjusted under 35 U.S.C. 154(b) by 401 days.

(21) Appl. No.: 17/581,133

(22) Filed: Jan. 21, 2022

(65) Prior Publication Data

US 2022/0230463 A1    Jul. 21, 2022

Related U.S. Application Data

(60) Provisional application No. 63/139,899, filed on Jan. 21, 2021.

(51) Int. Cl.
| | |
|---|---|
| *G06V 30/00* | (2022.01) |
| *G06F 3/04842* | (2022.01) |
| *G06F 40/242* | (2020.01) |
| *G06F 40/279* | (2020.01) |
| *G06V 30/19* | (2022.01) |
| *G06V 30/41* | (2022.01) |
| *G10L 21/10* | (2013.01) |

(52) U.S. Cl.
CPC .......... *G06V 30/41* (2022.01); *G06F 3/04842* (2013.01); *G06F 40/242* (2020.01); *G06F 40/279* (2020.01); *G06V 30/19013* (2022.01); *G10L 21/10* (2013.01)

(58) Field of Classification Search
CPC ...... G06V 30/41; G06V 30/19; G06F 40/279; G06F 40/242; G06F 3/04842; G10L 21/10
See application file for complete search history.

(56) References Cited

U.S. PATENT DOCUMENTS

| | | |
|---|---|---|
| 7,246,118 B2 | 7/2007 | Chastain et al. |
| 8,868,420 B1 | 10/2014 | Terrell, II et al. |
| 8,930,189 B2 | 1/2015 | Cath et al. |
| 9,069,767 B1 * | 6/2015 | Hamaker .............. G06F 40/194 |
| 9,282,149 B2 | 3/2016 | Johnston |
| 9,336,674 B1 | 5/2016 | Thirumalaisamy |
| 9,892,095 B2 | 2/2018 | Dow et al. |
| 10,170,102 B2 | 1/2019 | Bostick et al. |

(Continued)

*Primary Examiner* — Li Liu

(74) *Attorney, Agent, or Firm* — Richard C. Piercy, Esq.; Grell & Watson Patent Attorneys LLC

(57) ABSTRACT

An interactive system for identifying and correcting inconsistencies between a written work, an audio reading of the written work, and a resulting transcription of the audio reading. The system stores on a computing device connected to a network a manuscript, an audio version of the manuscript, and a transcription of the audio version of the manuscript. Via a transcription engine, difference and comparison engine, and a user device having a visual interface, a user is visually presented via the display the inconsistencies between the transcript and the manuscript, the user can amend the manuscript and/or the transcript to reconcile the works, the user can listen to a corresponding section of the corresponding audio file, and the user can interact with collaborators in a context aware interface. Upon the user processing, the manuscript may be read and listened to simultaneously as an enhanced e-book through a separate software tool.

18 Claims, 8 Drawing Sheets

(56) References Cited

U.S. PATENT DOCUMENTS

| | | | |
|---|---|---|---|
| 2013/0041747 A1* | 2/2013 | Anderson | H04N 21/8133 |
| | | | 715/733 |
| 2014/0040713 A1* | 2/2014 | Dzik | G10L 15/26 |
| | | | 715/203 |
| 2014/0282205 A1 | 9/2014 | Teplitsky et al. | |
| 2015/0340038 A1* | 11/2015 | Dzik | G10L 15/183 |
| | | | 704/235 |
| 2020/0051582 A1* | 2/2020 | Gilson | H04N 21/233 |
| 2022/0028390 A1* | 1/2022 | Poznanski | G10L 15/19 |

* cited by examiner

SYSTEM AND METHOD FOR FACILITATING THE SYNCHRONIZATION OF WRITTEN WORKS WITH ACCOMPANYING AUDIO

CROSS REFERENCE TO RELATED APPLICATIONS

To the full extent permitted by law, the present United States Non-Provisional Patent Application hereby claims priority to and the full benefit of, U.S. Provisional Application No. 63/139,899, filed Jan. 21, 2021, entitled "Application to Improve Synchronization of Written Works and Accompanying Audio", which is incorporated herein by reference in its entirety.

FIELD OF THE DISCLOSURE

The present disclosure is generally related to transcripts of audio recordings. More specifically, the present disclosure relates to the reconciliation of written works with a transcript of their audio equivalent for the simultaneous and synchronous use of both works in interactive multimedia playback.

The present disclosure is not limited to any specific device, language (computer or human), file formatting system, or operating system.

BACKGROUND

Electronic books, e-book devices, or e-books, are computing devices designed primarily for allowing readers to shop for, preview, access, download, view, and read written content such as books, magazines, and newspapers. Some e-books may serve some, all, or only those functions. Usually, a dedicated e-book usually comprises a computing device having at least a processor, a memory, a non-transitory computer readable medium, a network connection (usually wireless or mobile), a user input mechanism, and a display. Other e-books persist as applications within other computing devices such as laptops, tablets, smartphones, the like and/or combinations thereof. Some of the more recent and/or advanced dedicated e-book devices include features such as audio playback either natively or through headphones connected to the device(s).

E-books, whether dedicated devices or applications on other devices, allow users to obtain, retain, and even carry numerous works of authorship simultaneously. Additionally, many services exist which allow e-book titles to be stored offsite, such as in the "cloud", and even be lent from libraries or shared among users. This has opened various possibilities previously impossible when relying on physical printed books. For instance, voracious readers can travel with and consume large quantities of books, whether they be stored on a device or accessed via the web or internet, and internet social activities can be utilized to form a communal book reading experience. More recent innovations have paired e-book titles with their audiobook counterparts in order to harmonize the two works into a combined reading and being read to experience, similar to how many young students learn to read by following along with their teacher.

As the word would indicate, audiobooks are quite literally books converted into an audible, rather than visible, medium. They can be understood as any recording of a book or other work being read aloud. Typically, this means a professionally recorded verbal rendition of the reading of a written work by a professional voice actor. Other examples include fan-made or amateur versions of the same and even automated/machine generated audio using text-to-speech technologies. Though audiobooks of today differ greatly from their spoken word album ancestors, the technology related to what is involved in the actual consumption of an audiobook remains largely the same as when Disney published its "Disneyland Storyteller" series in the 1950s. While the audiobook consuming public may now be able to do so in places not previously possible, such as while flying or during exercise, the type of engagement with the audio has remained largely unchanged until very recently. Even though consumers wishing to read along with an audiobook could have always done so by simply purchasing both the audiobook and its written equivalent and reading the written work while listening to the audiobook, doing so required holding two identical places. A consumer may opt to use a bookmark, fold the page, or simply lock the device in the case of e-book, then pause the audio when they wish to come back to it. However, if a reader is suddenly interrupted by something, but wishes to remaining listening, it may be difficult to later reconcile where to continue reading along later. Additionally, though such a read along technique may be useful for new and/or struggling readers or those with learning differences, visual cues which can harmonize the act of reading and listening are rather new, despite analogous visual cues like sing along music videos having longstanding popularity and use.

Several solutions exist that enable e-book users to utilize the digital equivalent of bookmarks. For instance, the Google Reader™ generates digital tags for the last viewed page of an electronic document within its service. Amazon Kindle® and its Whispersync® feature automatically harmonizes stopping locations among devices which connect to its service. That way, when opening a Kindle™ e-book or any compatible document on another device which also connects to Amazon's service, users are asked whether they would like to continue reading from the last place the current device viewed or whether to synchronize with another device, which is further along in the written work. Additional features, such as synchronizing highlights, notes, and even facilitating social interactions within the e-book have been similarly introduced to increase a reader's ability to engage with the written work and to engage with others about it.

However, only very recently have innovations harmonized the written work with the audio equivalent. These innovations have serious shortfalls for the publishers and other entities responsible for achieving user satisfactory or even working results. As part of its "Whispersync® for Voice" offering, Amazon now offers publishers having catalogues of both e-books and audiobooks the ability to synchronize the work to enable something it has branded "Audible Narration". Important to the process required to accomplish this synchronization is the creation of an audio transcript of the audiobook. However, as anyone who has watched live television closed captioning or subtitled films knows, sometimes the words of a transcript of an audio file do not fully track with the words actually spoken by voice, television, or film actors. Whether the transcripts are human or machine generated, they are likely to contain errors. This problem is aggravated by a common occurrence in the creation of the audiobook itself. Occasional errors in reading or improvised lines may occur when a voice actor or other individual is recording a written work into audio form. That means that even an audio transcript having 100% fidelity with its audiobook source may not share that same fidelity with the written work upon which it is based. Since the transcript is quite literally a copy of a copy, these errors can compound, causing systems like Amazon Whispersync® to either sustain those errors or simply fail to produce a working synchronized work. These errors may be difficult to detect using only human review processes and computer aided technologies are being developed to reduce these efforts. However, no system is known to exist which enables a publisher or other entity synchronizing a written work with an audio counterpart to quickly and systematically identify these inconsistencies, correct them, and resolve any issues which may affect system operation and user experience. Additionally, of those systems which purport to solve such problems via automatic processes and/or human systematic approaches, none offer publishers and related entities the ability to combine each approach to ensure that when presented with written and audio works simultaneously, readers see, read, and hear what the publisher intends the user to see, read, and hear, given the necessary human involvement in making artistic and/or literary choices. Perhaps compounding these problems, an issue exists with regard to managing essentially three or possibly even more versions of the same work. In order to best accomplish the reader experience of reading along, systems which exist to facilitate the reading along may also require the audio work be timed or tagged to the manuscript as well as the transcript in order to visually cue the reader to the word being spoken within the text. If a publisher or other services/goods provider wishes to accomplish such an experience for its readers and users, other steps or tools may be required because words may not flow linearly or consistently during a dramatic reading. Finally, even if such a system for facilitating the synchronization of written work with accompanying audio could be accomplished by combining various tools already at the disposal of audio and software professionals, no system which presents synchronization-relevant information in a single visually interactive tool is known to exist.

Therefore, a need exists for a system and method of facilitating the synchronization of written work with accompanying audio. The instant disclosure may be designed to address at least certain aspects of the problems or needs discussed above by providing such a system and method for facilitating such synchronization.

SUMMARY

The present disclosure may solve the aforementioned limitations of the currently available systems and methods of facilitating the synchronization of written work with accompanying audio. With respect to facilitating the synchronization of written work with accompanying audio, the system and method of the disclosure may relate to a user interface, a transcription engine, and a differences and comparison engine. While the subject matter of the disclosure may be relevant to synchronizing a written work with its audio equivalent, the disclosure is not so limited and may be relevant across various areas that would be recognized by those having ordinary skill in the art. With regard to each of the user interface, the transcription engine, and the differences and comparison engine, various improvements to both enable and harmonize various technologies have been implemented to produce a mature product having the capabilities described herein.

In a potentially preferred exemplary embodiment, a new user interface may enable users to select a completed manuscript for a written work, upload it into a web-based system, select an audio counterpart for the manuscript, upload it into the web-based system, either provide and upload a transcription or generate one using the transcription engine included within the web-based system, generate a difference report summarizing inconsistencies using the differences and comparison engine included within the web-based system, and receive said differences report along with a list of needed changes. Upon receiving said list of needed changes, in the potentially preferred embodiment, a user may then remain in the web-based system interaction to select each difference and decide an appropriate action. Then, once such a decision has been made regarding whether or which of a number of appropriate actions should be taken, the user may then take such action with the web-based system and thereby produce a transcript and/or manuscript which most accurately reflects the words, phrases, and paragraphs as intended by the author, publisher, or other interested party. As for the transcription engine included within the web-based system for facilitating the synchronization of written work with accompanying audio, in this potentially preferred embodiment it may rely on one or more dictionaries, audio transcription libraries, slang dictionaries, artificially intelligent systems for audio transcription, the like and/or combinations thereof.

As those having ordinary skill in the art may be well aware, numerous systems exist for both the manual and software-assisted transcription of audio works and may be leveraged in other alternate embodiments of the system and method for facilitating the synchronization of written work with accompanying audio of the disclosure. Depending on various qualities of the audio recording such as the actor's fidelity to manuscript, the actor's voice and accent, and the quality of the recording itself, various tools, dictionaries, AI processes, systems, methods, and features may be included in a preferred embodiment of the system and method of the disclosure to achieve optimal results. With regard to the differences and comparison engine of the web-based system and method for facilitating the synchronization of written work with accompanying audio, the same may be true. Subsequent to the production of an audio transcript for an audiobook corresponding to a written work, a user may then be in possession of both a manuscript and an audio transcript, which may have separate utility altogether or be used for facilitating the synchronization of written work with accompanying audio using other systems. In this potentially preferred embodiment of the disclosure, however, a user having access to each after having uploaded each or having otherwise created a transcript using the system of the disclosure according to its methods, can then proceed to compare the manuscript and transcript without the need for additional systems and/or tools. Therefore, a single user experience may be provided by such a system for facilitating the synchronization of written work with accompanying audio.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The present disclosure will be better understood by reading the Detailed Description with reference to the accompanying drawings, which are not necessarily drawn to scale, and in which like reference numerals denote similar structure and refer to like elements throughout, and in which.

It is to be noted that the drawings presented are intended solely for the purpose of illustration and that they are, therefore, neither desired nor intended to limit the disclosure to any or all of the exact details of construction/layout shown, except insofar as they may be deemed essential to the claimed disclosure.

DETAILED DESCRIPTION

Referring now to FIGS. 1-8, in describing the exemplary embodiments of the present disclosure, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples and are merely examples among other possible examples.

The present disclosure solves the aforementioned limitations of the currently available devices and methods synchronizing written works with their audio equivalent by providing a system and method for facilitating the synchronization of written work with accompanying audio.

Figure 1:
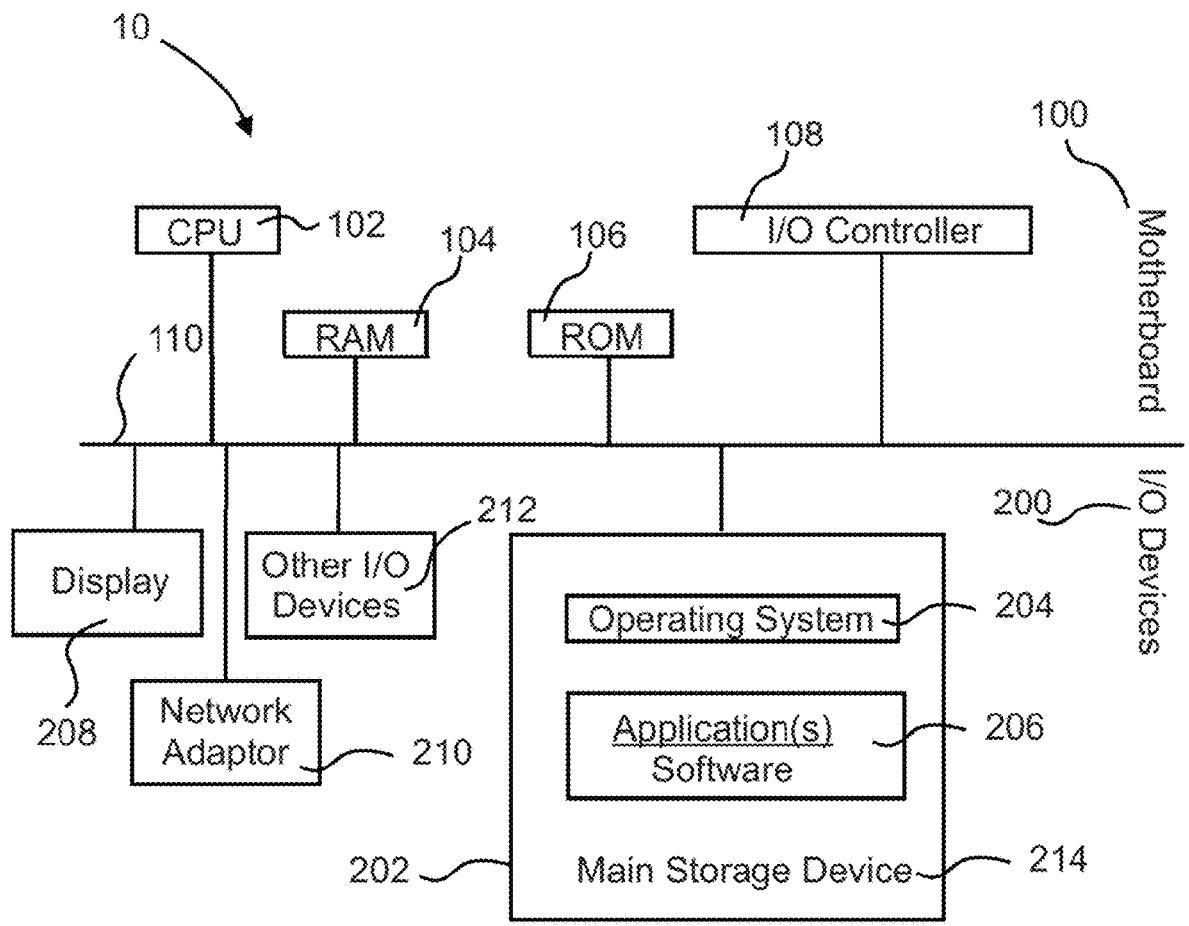
FIG. 1 is a block diagram of a computer system of the present disclosure.
Figure 2:
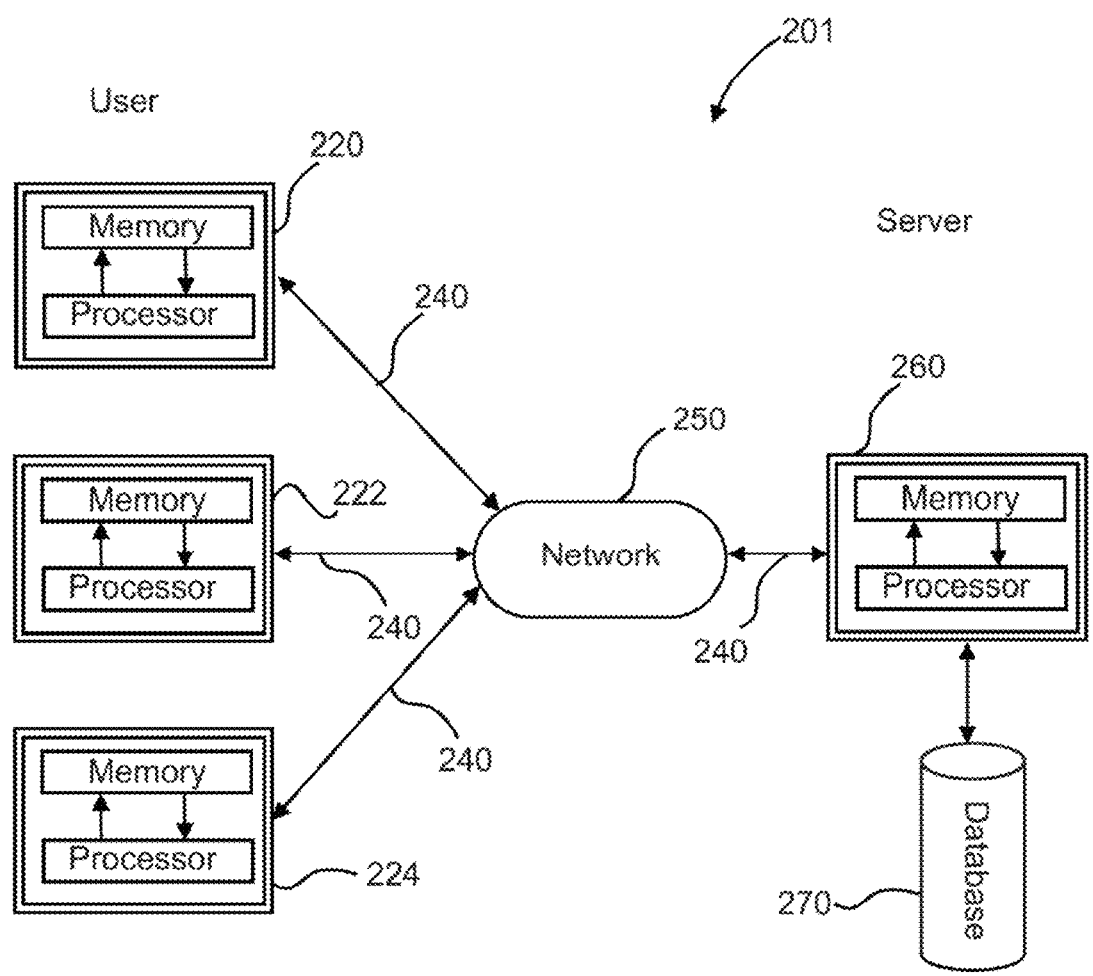
FIG. 2 is a block diagram of a communications system implemented by the computer system in FIG. 1.

In describing the exemplary embodiments of the present disclosure, as illustrated in FIGS. 1-2 specific terminology is employed for the sake of clarity. The present disclosure, however, is not intended to be limited to the specific terminology so selected, and it is to be understood that each specific element includes all technical equivalents that operate in a similar manner to accomplish similar functions. The claimed invention may, however, be embodied in many different forms and should not be construed to be limited to the embodiments set forth herein. The examples set forth herein are non-limiting examples, and are merely examples among other possible examples.

As will be appreciated by one of skill in the art, the present disclosure may be embodied as a method, a web-based user interface having backend processing capabilities, a data processing system, or a computer program product. Accordingly, the present disclosure may take the form of an entirely hardware embodiment, entirely software embodiment or an embodiment combining software and hardware aspects. Furthermore, the present disclosure may take the form of a computer program product on a computer-readable storage medium having computer-readable program code means embodied in the medium, or a networked combination of computer program products which form a service which can be provided to its users. Any suitable computer readable medium may be utilized, including hard disks, ROM, RAM, CD-ROMs, electrical, optical, magnetic storage devices, the like and/or combinations thereof.

The present disclosure is described below with reference to flowchart illustrations of methods, apparatus (systems) and computer program products according to embodiments of the present disclosure. It will be understood that each block or step of the flowchart illustrations, and combinations of blocks or steps in the flowchart illustrations, can be implemented by computer program instructions or operations. These computer program instructions or operations may be loaded onto a general-purpose computer, special purpose computer, or other programmable data processing apparatus to produce a machine or a network of machines, such that the instructions or operations, which execute on the computer(s) or other programmable data processing apparatus(es), create means for implementing the functions specified in the flowchart block or blocks/step or steps.

These computer program instructions or operations may also be stored in a computer-usable memory that can direct a computer or other programmable data processing apparatus to function in a particular manner, such that the instructions or operations stored in the computer-usable memory produce an article of manufacture including instruction means which implement the function specified in the flowchart block or blocks/step or steps. The computer program instructions or operations may also be loaded onto a computer or other programmable data processing apparatus (processor) to cause a series of operational steps to be performed on the computer or other programmable apparatus (processor) to produce a computer implemented process such that the instructions or operations which execute on the computer or other programmable apparatus (processor) provide steps for implementing the functions specified in the flowchart block or blocks/step or steps.

Accordingly, blocks or steps of the flowchart illustrations support combinations of means for performing the specified functions, combinations of steps for performing the specified functions, and program instruction means for performing the specified functions. It should also be understood that each block or step of the flowchart illustrations, and combinations of blocks or steps in the flowchart illustrations, can be implemented by special purpose hardware-based computer systems, which perform the specified functions or steps, or combinations of special purpose hardware and computer instructions or operations.

Computer programming for implementing the present disclosure may be written in various programming languages, database languages, and the like. However, it is understood that other source or object-oriented programming languages, and other conventional programming language may be utilized without departing from the spirit and intent of the present disclosure.

Referring now to FIG. 1 specifically, there is illustrated a block diagram of a computing system 10 that provides a suitable environment for implementing embodiments of the present disclosure. The computer architecture shown in FIG. 1 may be divided into two parts—motherboard 100 and the input/output (I/O) devices 200. Motherboard 100 preferably includes subsystems and/or processor(s) to execute instructions such as central processing unit (CPU) 102, a memory device, such as random-access memory (RAM) 104, input/output (I/O) controller 108, and a memory device such as read-only memory (ROM) 106, also known as firmware, which are interconnected by bus 110. A basic input output system (BIOS) containing the basic routines that help to transfer information between elements within the subsystems of the computer is preferably stored in ROM 106, or operably disposed in RAM 104. Computing system 10 further preferably includes I/O devices 202, such as main storage device 214 for storing operating system 294 and instructions or application program(s) 206, and display 208 for visual output, and other I/O devices 212 as appropriate. Main storage device 214 preferably is connected to CPU 102 through a main storage controller (represented as 108) connected to bus 110. Network adapter 210 allows the computer system to send and receive data through communication devices or any other network adapter capable of transmitting and receiving data over a communications link that is either a wired, optical, or wireless data pathway. It is recognized herein that central processing unit (CPU) 102 performs instructions, operations or commands stored in ROM 106 or RAM 104.

Processor 102 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 1 as a single processor, in some embodiments, processor 102 comprises a plurality of processors. The plurality of processors may be embodied on a single computing device or may be distributed across a plurality of computing devices collectively configured to function as the computing device 10. The plurality of processors may be in operative communication with each other and may be collectively configured to perform one or more functionalities of the computing device 10 as described herein. In an example embodiment, processor 102 is configured to execute instructions stored in memory 104, 106 or otherwise accessible to processor 102. These instructions, when executed by processor 102, may cause the computing device 10 to perform one or more of the functionalities of the computing device 10 as described herein.

Whether configured by hardware, firmware/software methods, or by a combination thereof, processor 102 may comprise an entity capable of performing operations according to embodiments of the present invention while configured accordingly. Thus, for example, when processor 102 is embodied as an ASIC, FPGA or the like, processor 102 may comprise specifically configured hardware for conducting one or more operations described herein. As another example, when processor 102 is embodied as an executor of instructions, such as may be stored in memory 104, 106, the instructions may specifically configure processor 102 to perform one or more algorithms and operations described herein.

The plurality of memory components 104, 106 may be embodied on a single computing device 10 or distributed across a plurality of computing devices. In various embodiments, memory may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 104, 106 may be configured to store information, data, applications, instructions, or the like for enabling the computing device 10 to carry out various functions in accordance with example embodiments discussed herein. For example, in at least some embodiments, memory 104, 106 is configured to buffer input data for processing by processor 102. Additionally, or alternatively, in at least some embodiments, memory 104, 106 may be configured to store program instructions for execution by processor 102. Memory 104, 106 may store information in the form of static and/or dynamic information. This stored information may be stored and/or used by the computing device 10 during the course of performing its functionalities.

Many other devices or subsystems or other I/O devices 212 may be connected in a similar manner, including but not limited to, devices such as microphone, speakers, flash drive, CD-ROM player, DVD player, printer, main storage device 214, such as hard drive, and/or modem each connected via an I/O adapter. Also, although preferred, it is not necessary for all of the devices shown in FIG. 1 to be present to practice the present disclosure, as discussed below. Furthermore, the devices and subsystems may be interconnected in different configurations from that shown in FIG. 1, or may be based on optical or gate arrays, or some combination of these elements that is capable of responding to and executing instructions or operations. The operation of a computer system such as that shown in FIG. 1 is readily known in the art and is not discussed in further detail in this application, so as not to overcomplicate the present discussion.

In some embodiments, some or all of the functionality or steps may be performed by processor 102. In this regard, the example processes and algorithms discussed herein can be performed by at least one processor 102. For example, non-transitory computer readable storage media can be configured to store firmware, one or more application programs, and/or other software, which include instructions and other computer-readable program code portions that can be executed to control processors of the components of system 201 to implement various operations, including the examples shown above. As such, a series of computer-readable program code portions may be embodied in one or more computer program products and can be used, with a computing device, server, and/or other programmable apparatus, to produce the machine-implemented processes discussed herein.

Any such computer program instructions and/or other type of code may be loaded onto a computer, processor or other programmable apparatuses circuitry to produce a machine, such that the computer, processor or other programmable circuitry that executes the code may be the means for implementing various functions, including those described herein.

Referring now to FIG. 2, there is illustrated a diagram depicting an exemplary system 201 in which concepts consistent with the present disclosure may be implemented or performed. Examples of each element within the communication system 201 of FIG. 2 are broadly described above with respect to FIG. 1. In particular, the server system 260 and user system 220 have attributes similar to computer system 10 of FIG. 1 and illustrate one possible implementation of computer system 10. Communication system 201 preferably includes one or more user systems 220, 222, 224, one or more server system 260, and network 250, which could be, for example, the Internet, public network, private network or cloud. User systems 220-224 each preferably include a computer-readable medium, such as random-access memory, coupled to a processor. The processor, CPU 102, executes program instructions or operations stored in memory. Communication system 201 typically includes one or more user system 220. For example, user system 220 may include one or more general-purpose computers (e.g., personal computers), one or more special purpose computers (e.g., devices specifically programmed to communicate with each other and/or the server system 260), a workstation, a server, a device, a digital assistant or a "smart" cellular telephone or pager, a digital camera, a component, other equipment, or some combination of these elements that is capable of responding to and executing instructions or operations.

Similar to user system 220, server system 260 preferably includes a computer-readable medium, such as random-access memory, coupled to a processor. The processor executes program instructions stored in memory. Server system 260 may also include a number of additional external or internal devices, such as, without limitation, a mouse, a CD-ROM, a keyboard, a display, a storage device and other attributes similar to computer system 10 of FIG. 1. Server system 260 may additionally include a secondary storage element, such as database 270 for storage of data and information. Server system 260, although depicted as a single computer system, may be implemented as a network of computer processors. Memory in server system 260 contains one or more executable steps, program(s), algorithm(s), or application(s) 206 (shown in FIG. 1). For example, the server system 260 may include a web server, information server, application server, one or more general-purpose computers (e.g., personal computers), one or more special purpose computers (e.g., devices specifically programmed to communicate with each other), a workstation or other equipment, or some combination of these elements that is capable of responding to and executing instructions or operations.

System 201 is capable of delivering and exchanging data between user system 220 and a server system 260 through communications link 240 and/or network 250. Through user system 220, users can preferably communicate over network 250 with each other user system 220, 222, 224, and with other systems and devices, such as server system 260, to electronically transmit, store, manipulate, and/or otherwise use data exchanged between the user system and the server system. Communications link 240 typically includes network 250 making a direct or indirect communication between the user system 220 and the server system 260, irrespective of physical separation. Examples of a network 250 include the Internet, cloud, analog or digital wired and wireless networks, radio, television, cable, satellite, and/or any other delivery mechanism for carrying and/or transmitting data or other information, such as to electronically transmit, store, manipulate, and/or otherwise modify data exchanged between the user system and the server system. The communications link 240 may include, for example, a wired, wireless, cable, optical or satellite communication system or another pathway. It is contemplated herein that RAM 104, main storage device 214, and database 270 may be referred to herein as storage device(s) or memory device(s).

Figure 3:
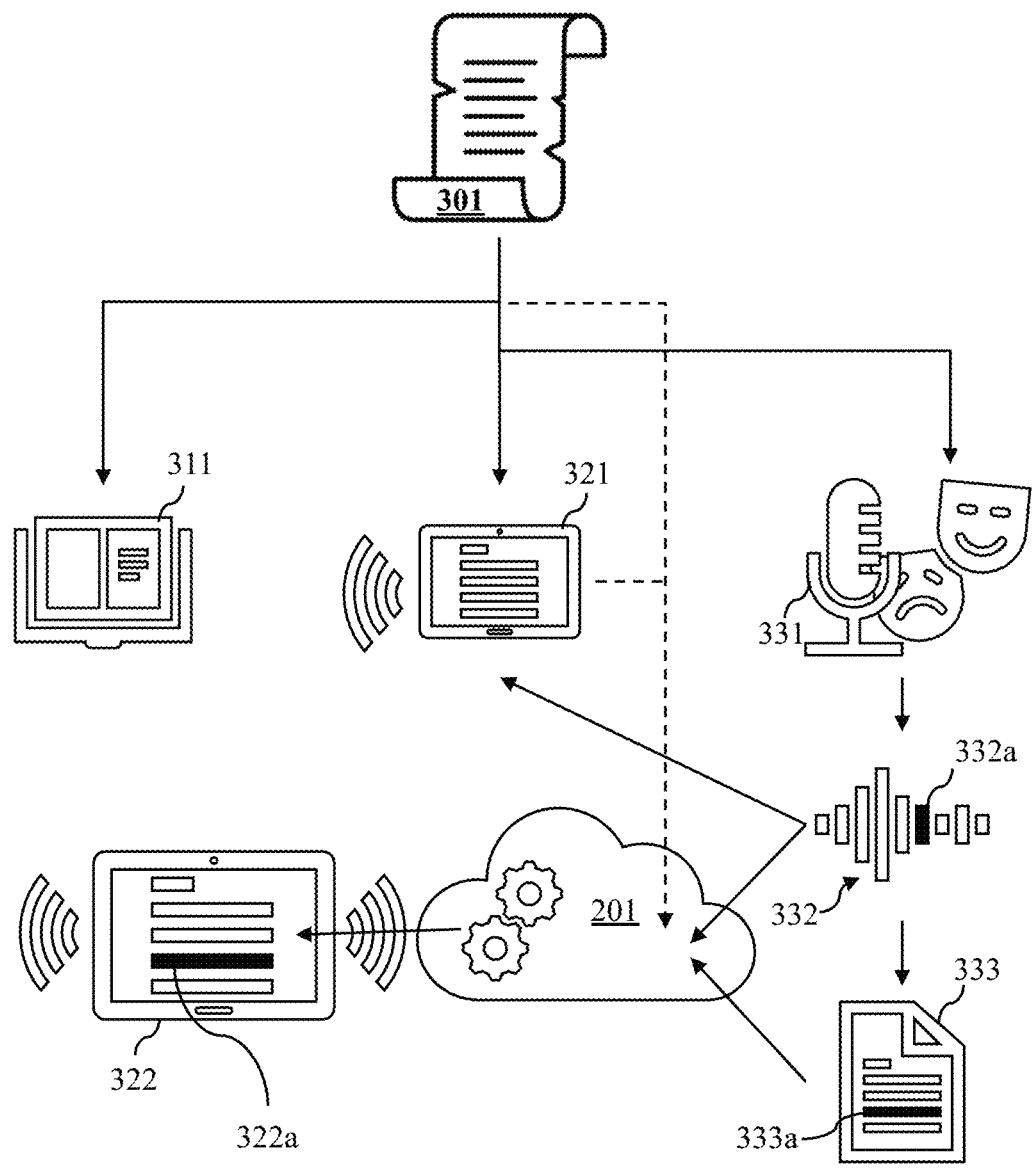
FIG. 3 is a mixed-block-and-pictograph diagram showing various features of the publishing industry, by way of example and not limitation, in the context of audiobook synchronization

Referring now specifically to FIG. 3, therein illustrated is a mixed block and pictograph diagram showing various features of the publishing industry, by way of example and not limitation, in the context of audiobook synchronization. Beginning at manuscript 301, printed book 311 and e-book 321 may each be separately derived from manuscript 301 by known, conventional means including but not limited to printing and binding or uploading for distribution, respectively. In order to create an audiobook, an additional step, which may be dramatic performance step 331, must be completed. This step, by way of example and not limitation, may involve an audio recording studio where an actor performs a (dramatic) reading of manuscript 301 into a recording device. Additional examples may include the creation of machine-generated audio from manuscript 301. Once dramatic performance step 331 has been completed, audio file 332 may be generated. As described herein, they character and type of audio file 332 may vary across regions, devices, and services, but audio file 332 may be generally understood as the audio equivalent of manuscript 301 for the purposes of this disclosure. Audio segment 332a may correspond to a specific segment of audio within audio file 332 and may share corresponding content within manuscript 301 as well as e-book 321 and printed book 311. Once a recording session has completed and any post-recording processing has been completed, transcript 333 may be generated through various means described in greater detail herein. As may be understood by those having ordinary skill in the art, audio segment 332a may then similarly share content with transcript segment 333a. Then, various machines connected via network 250 may combine to form system 201, which may be understood to encompass cloud computing technologies via web interfaces. System 201, in receipt of manuscript 301, audio file 332, and transcript 333 may leverage such cloud computing technologies to process manuscript 301, audio file 332, and transcript 333 into enhanced e-book 322, which includes read along phrase 322a, which may share content with audio segment 332a and transcript segment 333a. As may be understood by a person having ordinary skill in the art, the importance of each of read along phrase 322a, audio segment 332a and transcript segment 333a in relation to one another may enable the systems and methods of the disclosure and/or be one feature and/or end product of the disclosed systems and methods. As may be understood by those having skill in the art, it may be possible for either manuscript 301 or e-book 321 (or rather the digital e-book file stored thereon e-book 321), to be interchangeably uploaded to system 201 for processing as the digital e-book file may likely share greater fidelity with manuscript 301 than transcript 333. Additionally, it should be noted that should major distinctions between the digital e-book file and manuscript 301 exist, the digital e-book file may be preferred as it may likely be the file used to display on e-book 321.

Figure 4:
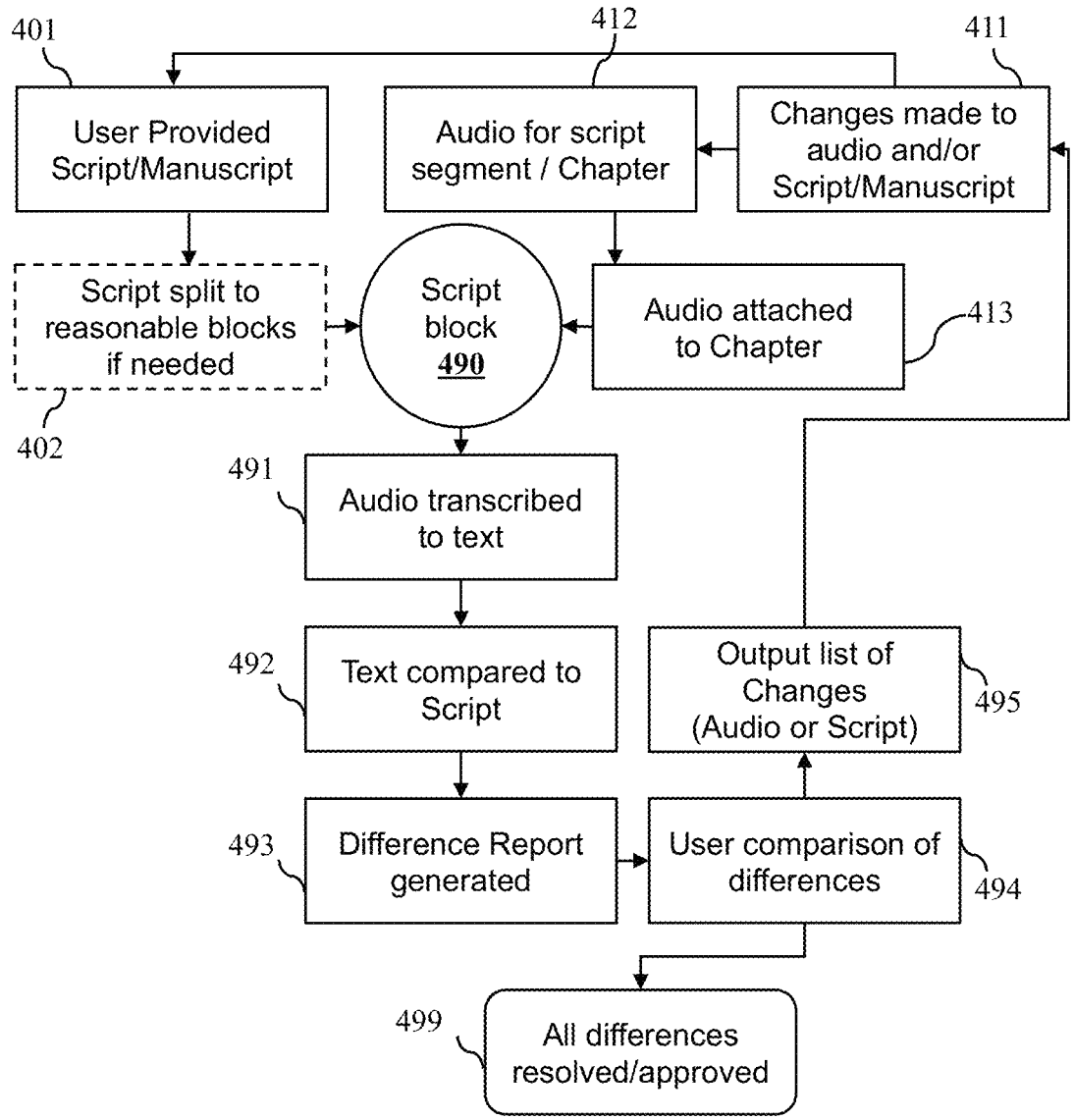
FIG. 4 is a flowchart diagram of the system and method for facilitating the synchronization of written work with accompanying audio.

Referring to FIG. 4, therein illustrated is a flowchart of an exemplary method for facilitating the synchronization of written work with accompanying audio of the disclosure, as it may be implemented on one or more of device 10 within system 201. Beginning at the top left of the diagram at script/manuscript provisioning step 401, a person having ordinary skill in the art can observe script/manuscript provisioning step 401 may involve a user in possession of a completed manuscript, such as manuscript 301, which may be recognized by those having ordinary skill in the art as the most accurate representation of the written work, and preferably in a format capable of machine reading (i.e., a digital file containing manuscript 301). This manuscript 301, may serve various purposes outside this disclosure, such as being available to the publisher for printing, uploading to e-book marketplaces, distribution to audiobook production professionals, translation, the like and/or combinations thereof, as described above. With regard to the systems and methods of the disclosure, manuscript 301 may be necessary for the enablement of reading along during an audiobook listening experience. Therefore, at script/manuscript provisioning step 401, this process can begin. Also included at script/manuscript provisioning step 401 may be the uploading, or otherwise making available to the system of the disclosure, manuscript 301. At splitting step 402, once system 201 is in receipt of manuscript 301, it may be divided into blocks or chapters to allow for system resources of system 201 to complete the various tasks outlined herein upon manuscript 301 for the production of enhanced e-book 322. This may occur automatically, may have been performed prior to upload, or may be a totally unnecessary step, depending on the inherent characteristics of manuscript 301. At audio upload step 412, once the user has an uploaded manuscript that is divided into blocks or chapters, the user may then upload audio file 332, which corresponds to manuscript 301. Given that audiobooks by and large are split into individual chapter files, a user may prefer at this step to upload or make available for processing each individual chapter file, each of which may be understood as audio file 332 which corresponds to individual blocks, segments or chapters of manuscript 301. Once the audio versions of the chapters are uploaded at audio upload step 412, the user may then initiate transcription process 491 which may cause system 201 to generate transcript 333 corresponding to audio file 332 simultaneously while it compares transcript 333 on-the-fly to manuscript 301 during comparison step 292. At difference report generation step 493, the comparison of manuscript 301 with transcript 333 may be summarized by system 201 into a Difference Report, which may include any discrepancies between the ordered written words of each work, their location, and potentially recommended and/or preferred correction advice. Those having ordinary skill in the art may recognize the Difference Report generated therein difference report generation step 493 may have separate and distinct utility in the reconciliation of audio versions of texts. Users may choose to review a Difference Report at user comparison step 494 to determine what, if any, corrections need to be made. If no corrections are needed or the user completes reconciliation of transcript 333 and manuscript 301 using system 201, the process may be completed at completion step 299. Should a user wish to continue reconciliation within system 201, the user may proceed to make changes to transcript 333, manuscript 301, or even audio file 332 at changes step 495, which may include the outputting of changes indicated and/or chosen by the user. User interface choices made by software developers in the creation of an interface capable of performing changes step 495 may be critically important to the speed and convenience by which changes are made. Once a user has chosen or indicated which changes should be made, system 201 may apply those changes to the corresponding files at application step 411. This cycle can then continue as a check of the work performed by system 201 and the user, simply by repeating the process upon the modified work(s).

Figure 5:
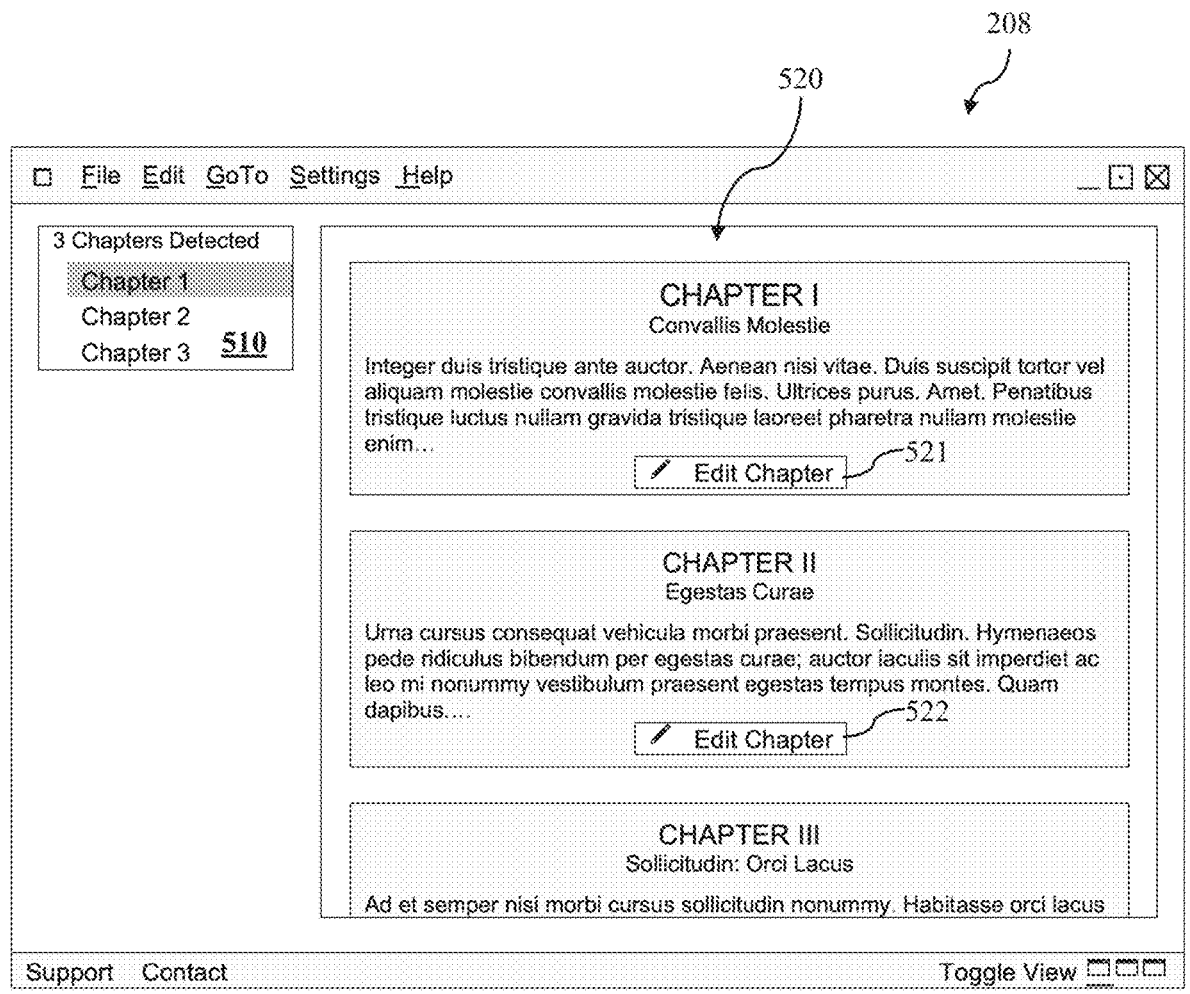
FIG. 5 is a first screenshot drawing of an exemplary user interface at the outset of the synchronization of written work with accompanying audio.

Turning to FIG. 5, therein illustrated is a first screenshot drawing of an exemplary user interface on display 208 at the outset of the synchronization of manuscript 301 with accompanying audio file(s) 332. Though it may be obvious to those having ordinary skill in the art, as illustrated herein FIGS. 5-7, Lorem Ipsum dummy text fills space which may otherwise be occupied by meaningful written content. One having ordinary skill in the art may understand this particular screenshot to appear after manuscript 302 and potentially audio file(s) 332 have been uploaded into system 201, or at/after script/manuscript provisioning step 401. At this screen, users may have the ability to select among chapters, which are presented in chapter preview column 520 as stacked chapters having chapter numbers, titles, and text previews. Using navigator 510, users may directly select chapters for further viewing, and by selecting chapter I edit button 521 or chapter II edit button 522 to edit (or begin processing) the respective chapter of manuscript 301, transcript 333, or audio file(s) 332. Additionally, further interaction may occur at navigator 501, such as, by way of example and not limitation, the uploading of audio file(s) 332 or transcript 333 (if such a transcript has been generated separately). Once a user has selected among these choices, another screen or user interface may appear on display 208, which will be explained in greater detail in relation to FIGS. 6-7.

Figure 6:
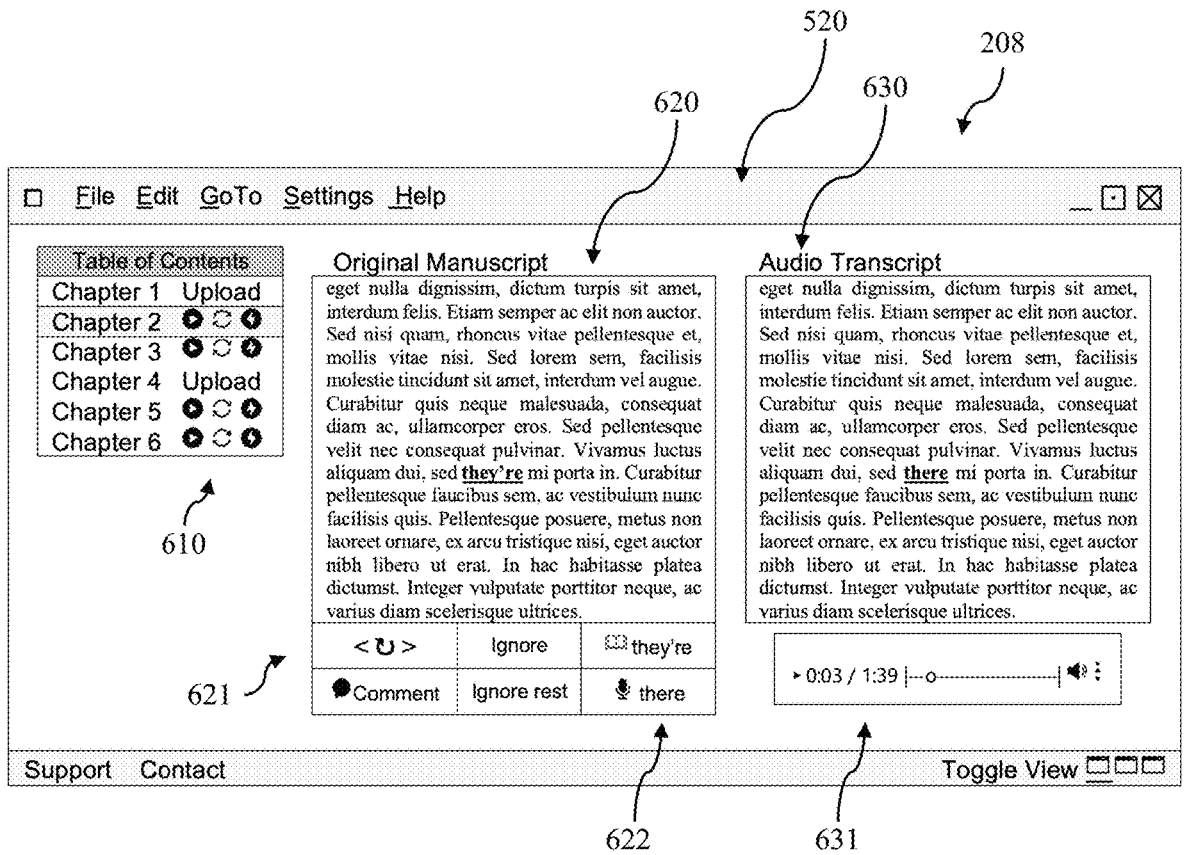
FIG. 6 is a second screenshot drawing of an exemplary user interface during the process of the same.
Figure 7:
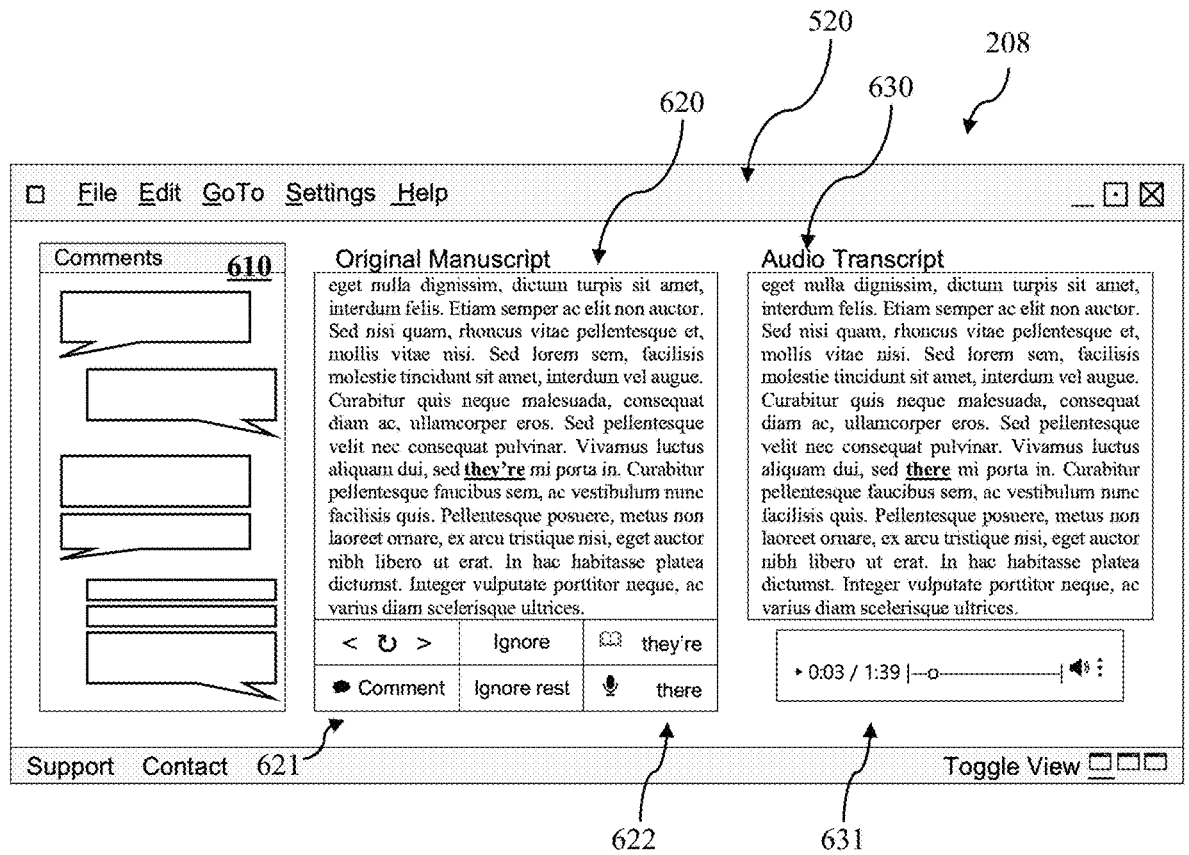
FIG. 7 is a third screenshot drawing of an exemplary user interface during the process of the same.

Referring now to FIGS. 6-7, therein illustrated are second and third screenshots drawings of exemplary user interfaces displayed on display 208 during intermediate phases of reconciliation of transcript 333, manuscript 301, and audio file(s) 332. Visually, during a reconciliation process being completed on display 208 by a user of system 201, information may be presented in logical columns. Navigation column 610 may serve various purposes, including but not limited to navigating within the overall written work corresponding to manuscript 301, visually indicating work performed versus not performed (such as table of contents on navigation column 610 as illustrated therein FIG. 6), user interactions (such as comment thread 710 as illustrated therein FIG. 7), the like and/or combinations thereof. Turning to the center column, or manuscript column 620, therein illustrated are a block, segment, or chapter preview, which a user may be presented with a portion of manuscript 301. Also therein manuscript column 620 are action buttons 621, which may include but are not limited to an advance button, a go back button, an add comment button, an ignore button, an ignore rest button, and correction choice buttons 622. Turning to the final column, or transcription column 630, therein illustrated is a preview of text found in a portion or chapter of transcript 333 and playhead 631. Importantly, system 201 may monitor user selections within navigation column 610, manuscript column 620, and transcription column 630 in order to synchronize navigation among the columns. For instance, should a user wish to hear a word spoken which is reflected on manuscript column 620 or transcription column 630, a user may have a variety of choices such as selecting one or more words within manuscript column 620, selecting one or more words within transcription column 630, and/or utilizing playhead 631. As illustrated herein, Lorem Ipsum text within manuscript column 620 and transcription column 630 contain nearly identical text. However, a common and potentially unavoidable transcription error has occurred with the homonyms "they're" and "there". Correspondingly, an exemplary method of visualizing that disparity (i.e., underlining) is illustrated by way of example and not limitation. Other exemplary methods include but are not limited to highlighting, color-coding, animation, colorful typefaces, increased typeface sizes, the like and/or combinations thereof. Notably, users may navigate among such discrepancies using action buttons 621 and correct them using correction choice buttons 622. So, for instance, a user may select correction choice buttons 622 corresponding to "they're" to signify that this is the proper term, and thereby cause a correction to be made by system 201 on transcript 333. Additionally notable, action buttons 621 may also include a comment button, which may cause navigation column 610 to display a threaded conversation to enable pairs and/or teams of users to collaborate to discuss in a SMS-style threaded conversations whether certain changes should be made and how. Importantly, such a threaded conversation may be linked to the corresponding section being discussed in order to provide instant context to the users interacting.

Figure 8:
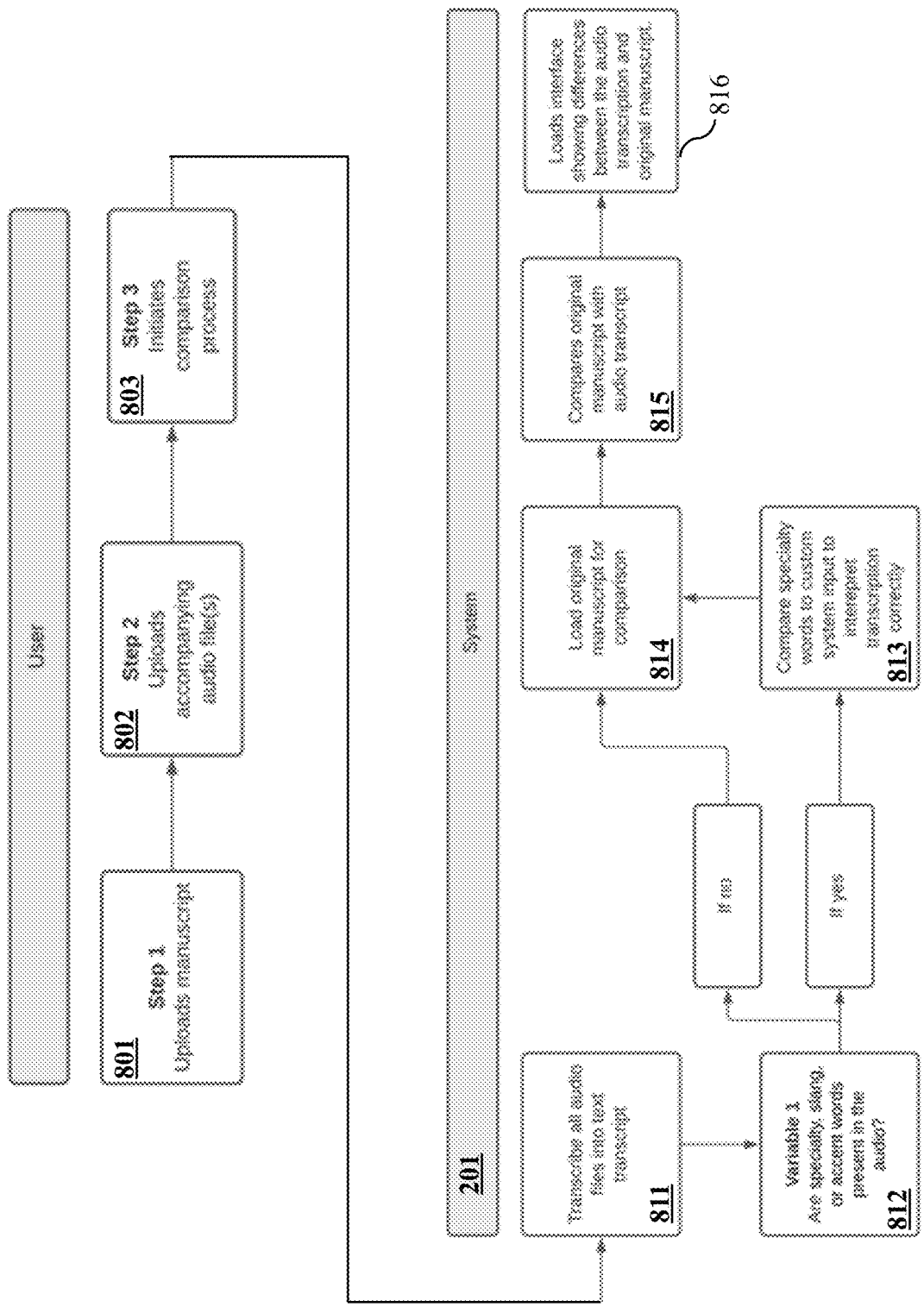
FIG. 8 is a block flow diagram of an alternate embodiment of the system and method.

Referring now to FIG. 8 specifically, therein illustrated is an additional exemplary embodiment of the disclosed system and method of facilitating the synchronization of written work with accompanying audio. At manuscript upload step 801, a user may upload manuscript 301 into system 201 followed by audio upload step 802 where a user may upload audio file(s) 332 in order to begin the comparison process at initiation step 803. Then, utilizing system 201, audio file(s) 332 may be transcribed into transcript 333. Based on the language contained within transcript 333 and manuscript 301, a user or system 201 may determine whether any slang dictionaries or other alternative dictionaries may be necessary in order to properly or more accurately transcribe audio file(s) 332 into transcript 333 at alternative dictionary determination step 812. If such a dictionary may be required, system 201 may compare specialty words to custom system input to interpret transcription correctly at alternative dictionary transcription step 813. After and/or alternatively to alternative dictionary transcription step 813, manuscript 301 may be loaded into system 201 at manuscript loading step 814 for comparison at manuscript-transcript comparison step 815. Finally, at interface presentation step 816, an interface showing differences between transcript 333 and manuscript 301 as described above may be presented to a user on display 208. Additional steps and/or features may include processes such as automatically reconciling after a user indication that repeated unique words, common mistakes, intentionally misspelled words, uncommon proper nouns, the like and/or combinations thereof should be reconciled in a specific way throughout transcript 333 or manuscript 301.

With respect to the above description, it is to be realized that the optimum logic, system, steps, user interface, features, data, positions, functions, and manner of operation and use are intended to be encompassed by the present disclosure. Preferably, the disclosed system may include standard hardware and software components in addition to new components. Screenshots are provided for exemplary purposes only. User interface, user experience, platform implementation, the like and/or combinations thereof may each be modified to obtain the desired results as described herein. The layout, function, colors, and words contained in any and all exemplary implementations may vary and are not intended to limit the disclosure. Steps of various methods provided in numbered lists or flow charts are provided to illustrate what the inventor perceives to be the best mode of accomplishing the specified functions and/or tasks, and do not limit the disclosure.

The disclosure is not limited to the audio recordings of read written works and may be applicable to any audiovisual work where transcription may be useful for providing value, utility, accessibility, features, the like and/or combinations thereof. It is contemplated herein that the system and method of the disclosure may be implemented on a web-based and/or cloud-based platform as described herein or it may be implemented on a locally installed program for use on a single or multi user system. Distributive computing, artificial intelligence, the like, and/or combinations thereof may be deployed on an implementation of the systems and methods of the disclosure to provide increased benefits to a user of the disclosed systems and methods. While the system and method of the disclosure specifically contemplates specific audiovisual products and/or services, the disclosure is not so limited. The disclosure is intended to encompass all variety of implementations of the disclosed system and method of improving the synchronization of written works and accompanying audio. While the system and method of the disclosure specifically contemplates the fixation of a written work, the transcription (reading and recording) into an audio work, and the subsequent synchronization and optimization of a combined written and audio work in a digital software as a service, the disclosure is not so limited to this unidirectional process. By way of example and not limitation, an unwritten audio or audiovisual work (e.g., improvisations, live performance, public speaking recordings, recorded interviews, the like and/or combinations thereof) may be manually or automatically transcribed, then receive the benefit of the systems and methods of the synchronization and optimization of the disclosure.

The system and method of the disclosure could also be enhanced, improved, and/or adapted in other ways not specifically described in the disclosure herein, but disclosed and/or known by the inventor or by those having skill in the art. All implementations of an application to improve the synchronization of written works and accompanying audio are intended to be encompassed by the disclosure herein.

The foregoing description and drawings comprise illustrative embodiments of the present disclosure. Having thus described exemplary embodiments, it should be noted by those ordinarily skilled in the art that the within disclosures are exemplary only, and that various other alternatives, adaptations, and modifications may be made within the scope of the present disclosure.

Merely listing or numbering the steps of a method in a certain order does not constitute any limitation on the order of the steps of that method. Many modifications and other embodiments of the disclosure will come to mind to one ordinarily skilled in the art to which this disclosure pertains having the benefit of the teachings presented in the foregoing descriptions and the associated drawings. Although specific terms may be employed herein, they are used in a generic and descriptive sense only and not for the purposes of limitation. Moreover, the present disclosure has been described in detail, it should be understood that various changes, substitutions, and alterations can be made thereto without departing from the spirit and scope of the disclosure as defined by the appended claims. Accordingly, the present disclosure is not limited to the specific embodiments illustrated herein, but is limited only by the following claims.

The invention claimed is:

1. A method for reconciling a manuscript with a transcript corresponding to an audio file containing a spoken rendition of the manuscript, the method comprising:
  receiving the manuscript at an at least one computing device having a processor, a memory, a non-transitory computer readable medium, and a connection to a network;
  receiving the audio file at said at least one computing device; transcribing via said processor the audio file into the transcript; comparing the manuscript to the transcript;
  generating a list of differences between the manuscript and the transcript;
  displaying a user interface on a display of a user computing device having a second processor, a second memory, a second non-transitory computer readable medium, said display, and a second connection to said network, said user interface comprises a navigation interface, a manuscript previewer, and a transcript previewer
  displaying on said manuscript previewer a segment of the manuscript; and displaying on said transcript previewer, a segment of the transcript corresponding to said segment of the manuscript;

wherein said segment of the manuscript and said segment of the transcript correspond to said spoken word segment of the manuscript.

2. The method of claim 1, further comprising the step of visually indicating to said user a location of an at least one of said list of differences contained within an at least one of said segment of the manuscript and said segment of the transcript.

3. The method of claim 2, further comprising the step of playing said at least one corresponding audio file proximate said at least one of said list of differences.

4. The method of claim 2, further comprising the step of playing said at least one corresponding audio file proximate a user selection of a word of at least one of said segment of the manuscript and said segment of the transcript.

5. The method of claim 2, further comprising the step of requesting said user select between a manuscript word or a transcript word corresponding to an at least one of said list of differences, thereby generating a user selection.

6. The method of claim 5, wherein said location of said at least one of said difference contained within said at least one of said segment of the manuscript and said segment of the transcript is visually indicated by an at least one visual indicators from a group of visual indicators, the group consisting of a highlight, an underline, a holding, a color-code, an animation, and a magnification.

7. The method of claim 5, wherein the transcribing step further comprises the step of detecting whether a slang is included within said audio file.

8. The method of claim 7, wherein a dictionary corresponding to said slang is utilized during the transcribing step.

9. The method of claim 6, further comprising the step of finalizing an at least one of the manuscript and the transcript for use in a e-book device having a reading along capability.

10. A system for reconciling a manuscript with a transcript corresponding to an audio file containing a spoken rendition of the manuscript, the system comprising:

an at least one computing device having a processor, a memory, a non-transitory computer readable medium, and a connection to a network, said memory and said non-transitory computer readable medium are capable of storing a plurality of instructions, the manuscript, the audio file, and the transcript, said processor in communication with said memory is configured to, via communication with said memory, cause the processor to:

receive the manuscript and the audio file via said connection to said network; execute a first instruction, said first instruction to transcribe via said processor in communication with said memory the audio file into the transcript; execute a second instruction, said second instruction to compare the manuscript to the transcript;

execute a third instruction, said third instruction to generate a list of differences between the manuscript and the transcript;

a user computing device having a second processor, a second memory, a second non-transitory computer readable medium, a display, and a second connection to said network, wherein said second processor and said user computing device are configured to, via communication with said second memory, cause the second processor to:

display upon said display a user interface to a user, said user interface comprises a navigation interface, a manuscript previewer and a transcript previewer;

display on said manuscript previewer a segment of the manuscript; and display on said transcript previewer a segment of the transcript corresponding to said segment of the manuscript;

wherein said segment of the manuscript and said segment of the transcript correspond to a segment of said audio file.

11. The system of claim 10, wherein said second processor and said user computing device are further configured to, via communication with said second memory, cause the second processor to visually indicate to said user via said display a location of an at least one of said list of differences contained within an at least one of said segment of the manuscript and said segment of the transcript.

12. The system of claim 11, wherein said user computing device is further configured to provide a playback of said audio file proximate said at least one of said list of differences.

13. The system of claim 11, wherein said user computing device is further configured to provide a playback of said audio file proximate a user selection of a word of at least one of said segment of the manuscript and said segment of the transcript.

14. The system of claim 11, wherein said user computing device further comprises a user input device, said user input device is capable of receiving a user selection of a manuscript word or a transcript word corresponding to an at least one of said list of differences.

15. The system of claim 14, wherein said display is capable of displaying to said user an at least one visual indicator from a group of visual indicators, the group consisting of a highlight, an underline, a holding, a color-code, an animation, and a magnification.

16. The system of claim 15, wherein stored thereon said non-transitory computer readable medium is a slang dictionary.

17. The system of claim 16, wherein said at least one computing device is further configured to detect whether a slang is present on said audio file.

18. The system of claim 17, wherein said at least one computing device is further configured to transcribe said audio file using said slang dictionary.

* * * * *